US008677236B2

(12) United States Patent
Bower et al.

(10) Patent No.: US 8,677,236 B2
(45) Date of Patent: Mar. 18, 2014

(54) CONTACT-SPECIFIC AND LOCATION-AWARE LEXICON PREDICTION

(75) Inventors: Jason Michael Bower, Bothell, WA (US); Rui Li, Beijing (CN); Kenichi Morimoto, Sagamihara (JP); Honghui Sun, Beijing (CN); Simon Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 783 days.

(21) Appl. No.: 12/340,088

(22) Filed: Dec. 19, 2008

(65) Prior Publication Data

US 2010/0161733 A1    Jun. 24, 2010

(51) Int. Cl.
*G06F 17/00* (2006.01)
*G06F 7/00* (2006.01)

(52) U.S. Cl.
USPC ........... 715/256; 715/234; 715/257; 715/259; 707/751; 707/919; 704/240; 704/251

(58) Field of Classification Search
USPC ......... 715/200, 204, 205, 234, 256, 257, 259, 715/273, 760; 707/609, 705, 706, 709, 710, 707/721, 723, 748, 751, 805, 917, 918, 707/919; 704/240, 246, 251, E15.022, 704/E15.023
See application file for complete search history.

(56) References Cited

U.S. PATENT DOCUMENTS

| 5,907,680 | A  | * | 5/1999 | Nielsen .......................... 709/228 |
| 7,111,248 | B2 | * | 9/2006 | Mulvey et al. ................. 715/812 |
| 2003/0234821 | A1 |  | 12/2003 | Pugliese |
| 2005/0017954 | A1 | * | 1/2005 | Kay et al. ....................... 345/169 |
| 2005/0125217 | A1 | * | 6/2005 | Mazor ................................. 704/1 |
| 2006/0156233 | A1 | * | 7/2006 | Nurmi ............................. 715/532 |
| 2006/0247915 | A1 |  | 11/2006 | Bradford et al. |
| 2006/0293904 | A1 | * | 12/2006 | Ramanathan et al. ............ 705/1 |
| 2007/0016862 | A1 |  | 1/2007 | Kuzmin |
| 2007/0061753 | A1 |  | 3/2007 | Ng et al. |
| 2007/0094024 | A1 |  | 4/2007 | Kristensson et al. |
| 2008/0070604 | A1 |  | 3/2008 | Castagnet |
| 2008/0076472 | A1 |  | 3/2008 | Hyatt |
| 2008/0126314 | A1 |  | 5/2008 | Thorn |
| 2008/0126436 | A1 |  | 5/2008 | Thorn |
| 2008/0182599 | A1 | * | 7/2008 | Rainisto et al. ................ 455/466 |

OTHER PUBLICATIONS

Garmin, "Nuvi 610/660/670 Owner's Manual," pp. 14-15 (Feb. 2007), available at http://www8.garmin.com/manuals/1262_OwnersManual.pdf ("Nuvi").*

(Continued)

*Primary Examiner* — Maikhanh Nguyen
(74) *Attorney, Agent, or Firm* — Aaron Chatterjee; Andrew Sanders; Micky Minhas (57) ABSTRACT

Word predictions in a message are selected or prioritized based on the recipient of the message and a previous location of use by a user. An input history is created based on messages sent to the recipient from the user at a particular location (e.g., global positioning system coordinates). As the user composes subsequent messages, a current location of the user is determined. Word predictions are performed based on a comparison of the current location to the previous locations, and based on the recipient(s). In further embodiments, location-aware spell-check functionality is provided for the messages.

20 Claims, 9 Drawing Sheets

(56) References Cited

OTHER PUBLICATIONS

Bosch, et al."Efficient Context-Sensitive Word Completion for Mobile Devices", Retrieved at<<http://ilk.uvt.nl/~toine/publications/vandenbosch.2008.mobilehci-2008-paper.pdf>>, MobileHCI 2008, Sep. 2-5, 2008, Amsterdam, the Netherlands, ACM, pp. 465-470.

"Windows Mobile ", Retrieved at<<http://www.microsoft.com/canada/windowsmobile/wm07/gettingstarted/smartphone/text.mspx>>, Oct. 1, 2008, pp. 1-3.

* cited by examiner

CONTACT-SPECIFIC AND LOCATION-AWARE LEXICON PREDICTION

BACKGROUND

Entering text on mobile devices is difficult for users. Mobile devices have small displays and reduced size keyboards that make it difficult for users to quickly type text messages to other users. Some existing systems provide word prediction based on text input. The predictions rely on words previously input by a user. As the user inputs text into a computing device, the text input is matched against the previously input words to determine if any words or phrases match the text input. Any matches to the user input are sent to the input method that then displays the words on the display for the user to select. The user either selects the words on the display or continues typing.

Existing systems, however, provide the same word prediction when communicating with different people. For example, when the user sends an electronic message to a manager, the user is likely to use words such as the names of other co-workers, business contacts, or current projects. When the user sends messages to a family member, the user will likely not use the same set of words.

SUMMARY

Embodiments of the invention provide location-aware word prediction based on a recipient of a message. Each of a plurality of words has one or more geographic locations and one or more recipients associated therewith. As the user composes a message, word predictions are generated. A recipient of the message is identified, along with a geographic location of a computing device of the user. One or more of the word predictions are selected based on the identified recipient and geographic location of the computing device. The selected word predictions are provided to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, words entered in a message by a user 102 on a computing device 504 are stored with attributes describing a context of the message. The attributes include, for example, a recipient of the message and a location of the computing device 504 at the time of creation or delivery of the message. In some embodiments, the stored words and associated attributes are used to select a dictionary during a spell-check.

Embodiments of the disclosure are operable with words in any language, including both symbol-based languages (e.g., Chinese and Japanese) and non-symbol-based languages (e.g., English). Further, embodiments of the disclosure are operable with any form of message that includes a recipient. For example, both electronic mail messages and instant messages are contemplated.

Figure 1:
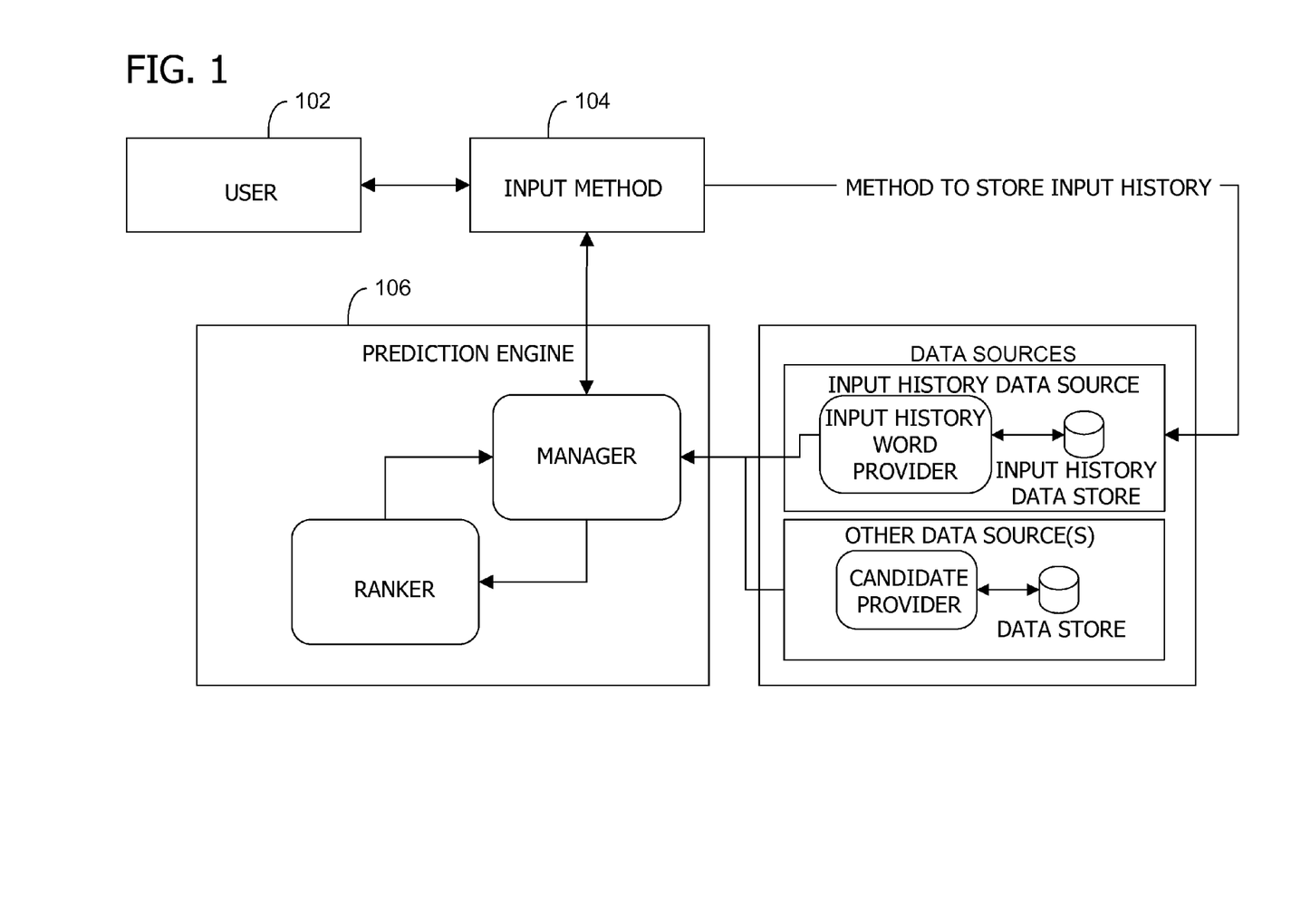
FIG. 1 is an exemplary block diagram illustrating a prediction engine that supports input history based prediction.

Referring to FIG. 1, an exemplary block diagram illustrates a prediction engine 106 that supports input history based prediction. In the example of FIG. 1, the prediction engine 106 is separate from an input method 104. Exemplary input methods 104 include computing devices such as mobile computing devices, tablet computing devices, and laptops. As the user 102 enters text via the input method 104, the input history is stored in one or more data sources. For example, the data is stored in a data source as input history data. In some embodiments, user attribute data is associated with each word that is stored in an input history data store. When the user 102 types a message, notification, or other communication, the words that the user 102 types are stored as part of the data sources along with an attribute that describes the recipient(s) of the message.

An exemplary prediction engine 106 includes a manager and a ranker for accessing the data sources to select and rank word predictions and provide the predictions to the user 102 via the input method 104 as the user 102 enters text. As the user 102 types a message to one or more of the recipients, the input history data store ranks words that the user 102 has typed previously to the recipients higher than words that the user 102 has not typed previously.

Figure 2:
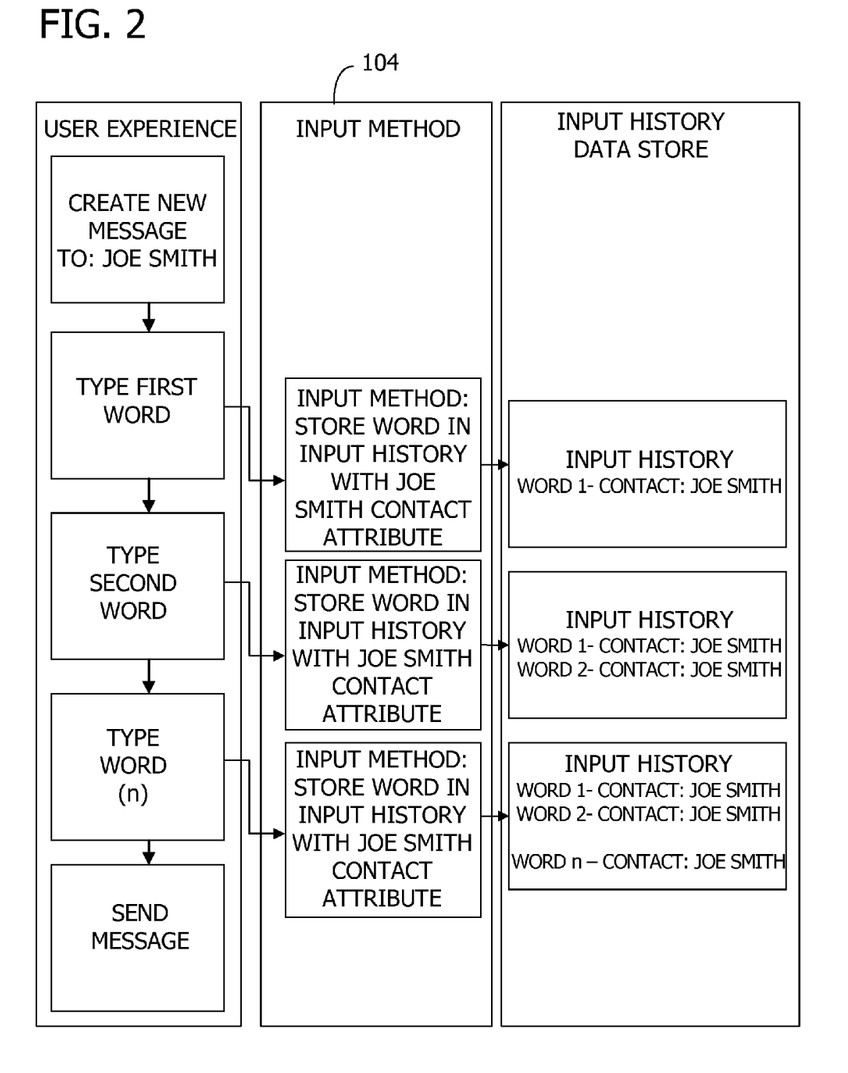
FIG. 2 is an exemplary block diagram illustrating a process to collect input history based on a contact.

Referring next to FIG. 2, an exemplary block diagram illustrates a process to collect input history based on a contact or recipient. In the example of FIG. 2, the user 102 creates a message on the computing device 504 such as a mobile computing device 802. In the TO field, the user 102 addresses the message to Joe Smith. The user 102 types the first word of the message. Once the word is typed, the input method 104 stores the word in the input history data store and attaches a contact attribute that is used to determine that the word was typed to recipient "Joe Smith." As the user 102 types additional words in the message, each additional typed word is added to the input history data store with the "Joe Smith" attribute.

Figure 3:
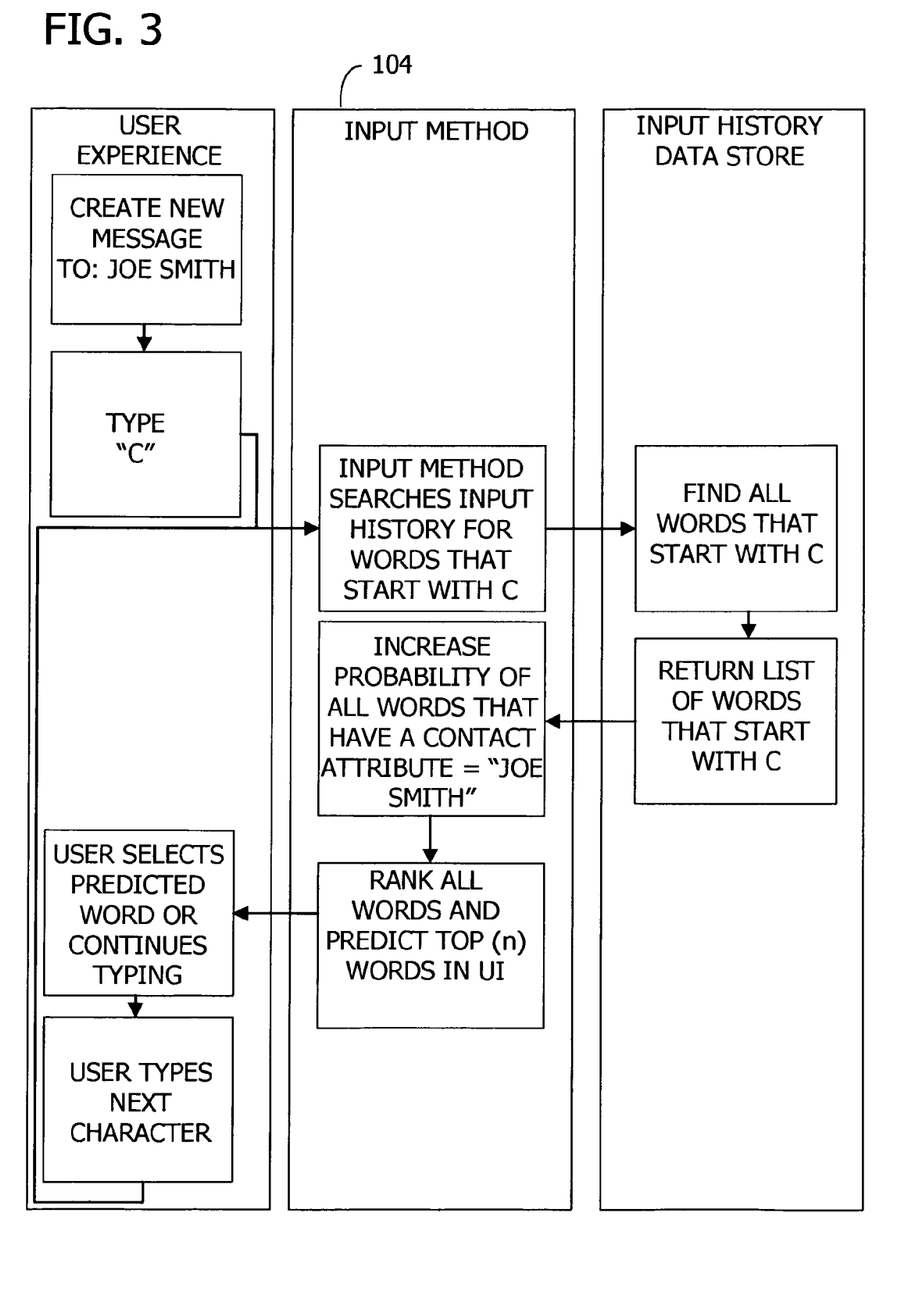
FIG. 3 is an exemplary block diagram illustrating input word prediction based on a message recipient.

Referring next to FIG. 3, an exemplary block diagram illustrates input word prediction based on a message recipient. After words are stored in the input history data store with the attributes, the input method 104 start predicts words with different probabilities based on whether or not the word was used when previously communicating with one of the recipients. In the example of FIG. 3, the user 102 creates a new message to "Joe Smith." When the user 102 types a letter, in this case "C," the input method 104 searches the input history for all words that start with "C". The input history data store returns the list of all words. Because there is likely to be many words that start with "C," the input method 104 ranks the words to determine which words are presented to the user 102. Because each word in the input history may have a recipient attribute associated therewith, the input method 104 prioritizes words that the user 102 has written to Joe Smith that start with "C" above other words that also start with "C." The input method 104 provides the prioritized or ranked list of words to the user 102. The user 102 either selects one of the words displayed or continues typing. If the user 102 continues typing, the additional typed text forms a multi-character prefix on which to search in the input history data source.

Figure 4:
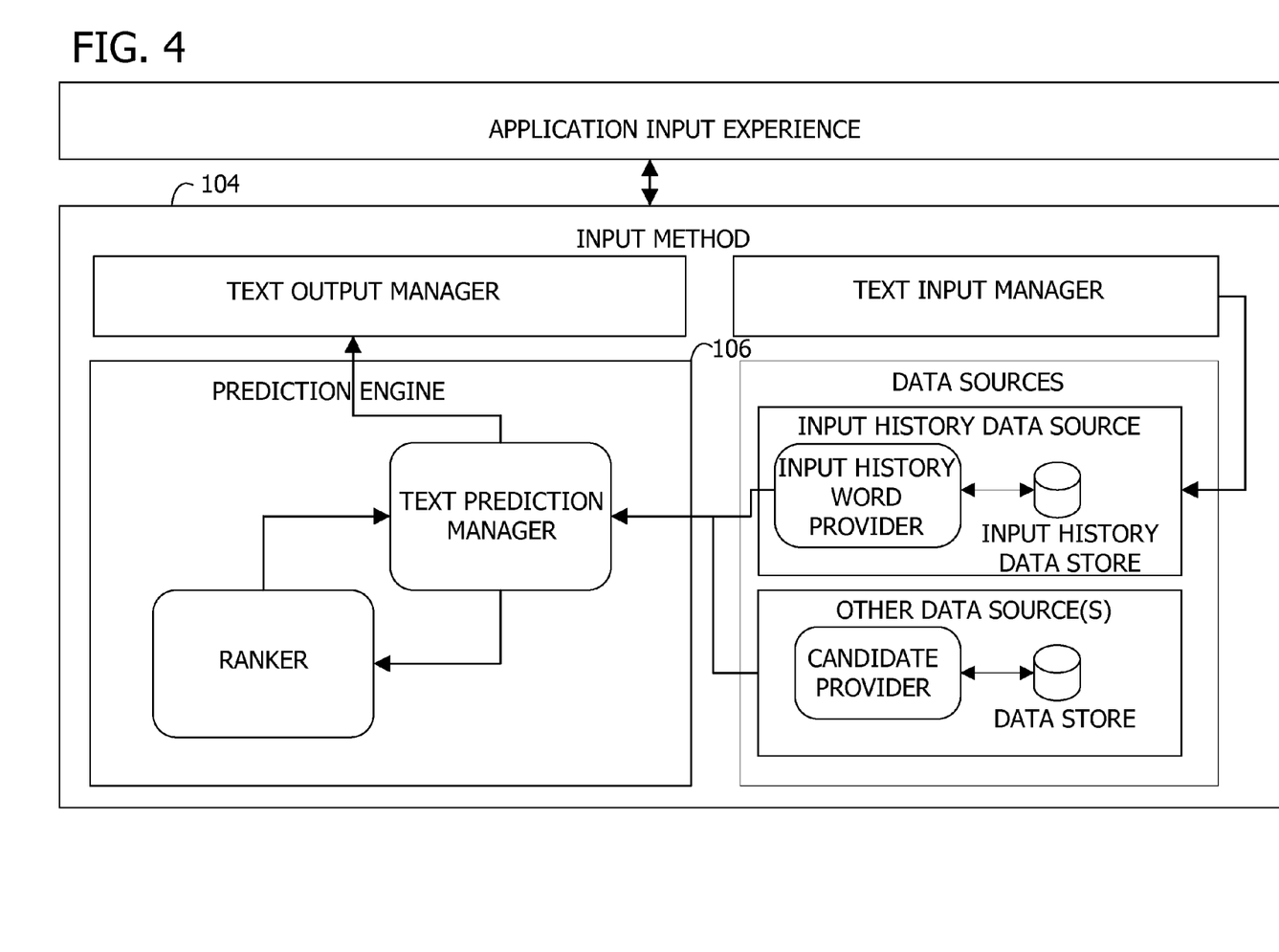
FIG. 4 is an exemplary block diagram illustrating an input method that supports input history based prediction.

Referring next to FIG. 4, an exemplary block diagram illustrates the input method 104 that supports input history based prediction. In the example of FIG. 4, the input method 104 (e.g., computing device 504 of the user 102), has the prediction engine 106 encapsulated therein. Such embodiments include, for example, the user 102 interacting with the mobile computing device 802.

Figure 5:
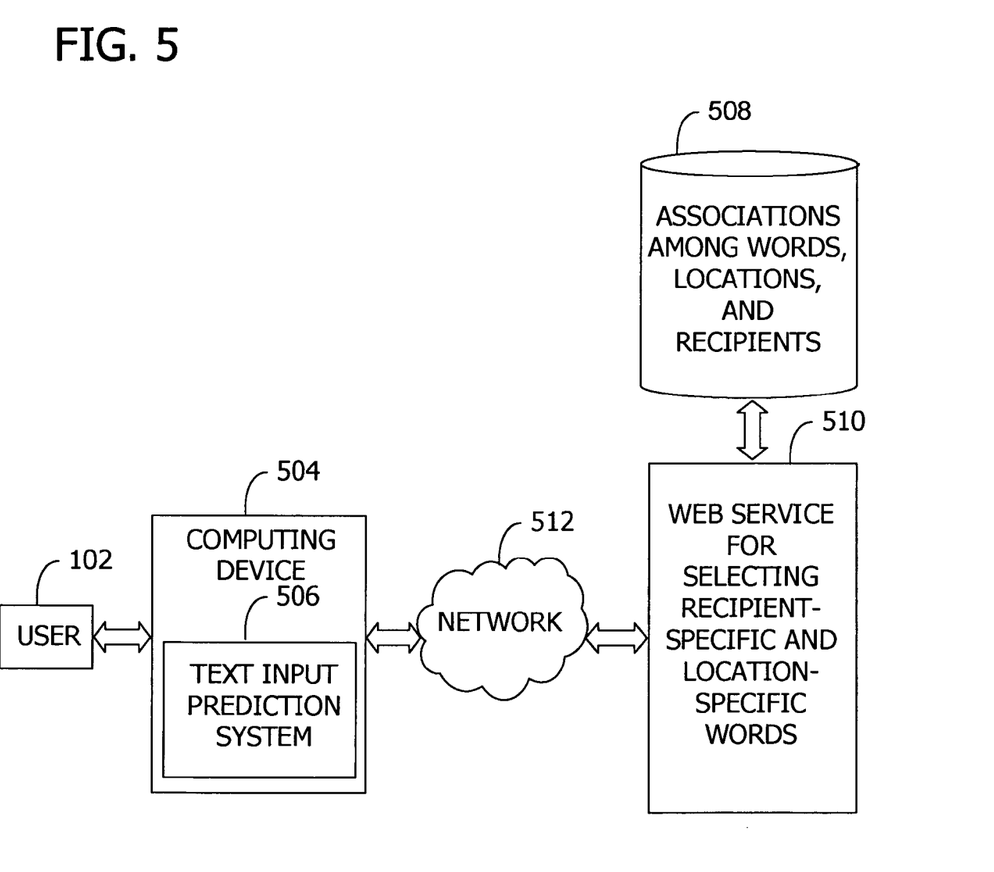
FIG. 5 is an exemplary block diagram illustrating a web service for selecting words based on a message recipient and a geographic location.

Referring next to FIG. 5, an exemplary block diagram illustrates a web service 510 for selecting words based on a message recipient and a geographic location. In the example of FIG. 5, the user 102 interacts with the computing device 504. The computing device 504 includes a text input prediction system 506 such as the prediction engine 106 in FIG. 1 and FIG. 4. The computing device 504 is communicatively coupled to the web service 510 via a network 512. The web service 510 provides context-specific word prediction functionality.

In some embodiments, the web service 510 provides the context-specific word prediction functionality based lexicon data. The lexicon data represents associations among words, contacts, and optionally a location of the user 102. The web service 510 is accessible by any of a plurality of computing devices via a network such as the Internet. The computing devices execute, among other applications, a speech recognition engine, a handwriting recognition engine, and a spell check engine.

In the example of FIG. 5, words are predicted based not only on the recipient of the message (e.g., recipients on the TO line as well as recipients on the carbon copy line or blind carbon copy line), but also on a current location of the computing device 504 relative to a location of the computing device 504 when the words were previously typed by the user 102 and/or sent in a previous message. To this end, the web service 510 selects recipient-specific and location-specific words by accessing a computer-readable medium 508 or other memory area. The computer-readable medium 508 stores associations among words, locations, and recipients. The associations represent lexicon data in some embodiments. The computer-readable medium 508 becomes populated with the associations in a manner similar to the description with reference to FIG. 2, and is next described with reference to FIG. 6.

While the example of FIG. 5 illustrates the computing device 504, aspects of the disclosure are operable with any quantity of computing devices of the user 102 such as a cellular telephone, gaming console, or any device enabling the user 102 to compose messages. The associations stored in the computer-readable medium 508 are available to the user 102 upon login using any of the devices.

Figure 6:
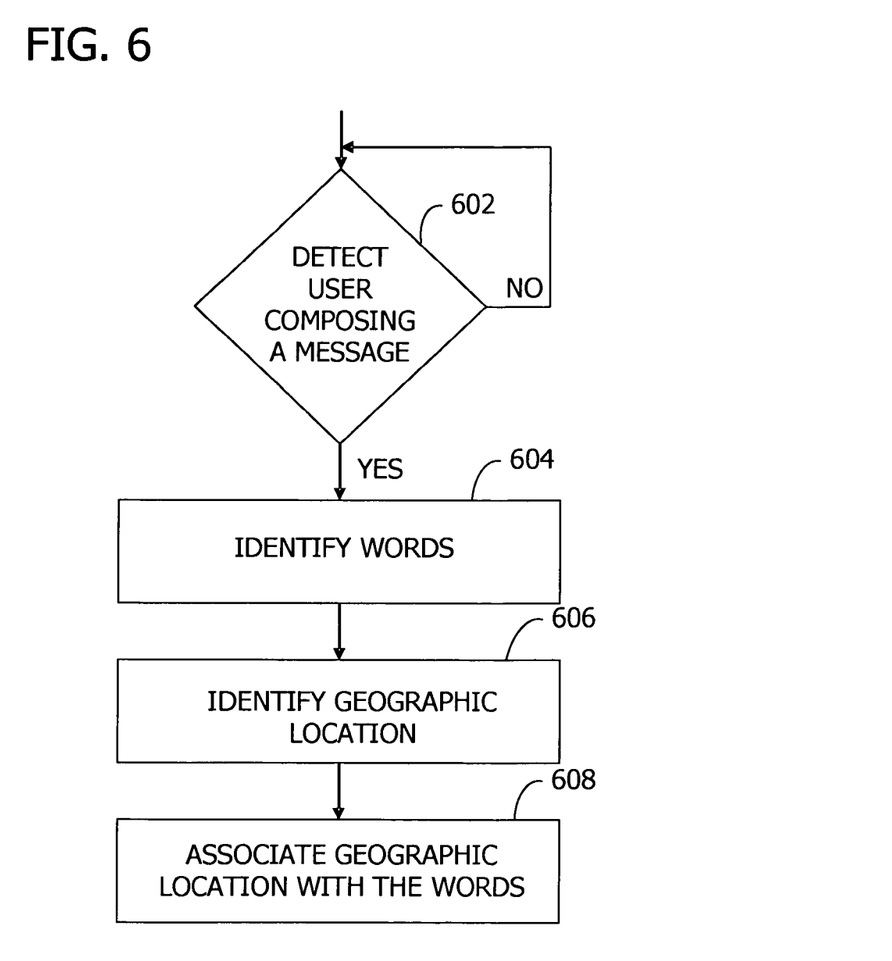
FIG. 6 is an exemplary flow chart describing the associations of words, geographic locations, and message recipients.

Referring next to FIG. 6, an exemplary flow chart describes the associations of words, geographic locations, and message recipients. When the user 102 composes a first message at 602, words within the message are identified at 604. The words may be identified as the user 102 is typing, at the time of message delivery, or any other time. A geographic location of the computing device 504 of the user 102 is identified at 606. The identified geographic location and the message recipient(s) are associated within the identified words at 608. For example, the association or relationship among the locations, recipients, and words is stored in a memory area for subsequent analysis.

In some embodiments, words in addition to those entered into the message may be identified. Other data sources are mined to extract words that may be relevant to the recipient. For example, web pages (e.g., on social networking sites) listing the recipient name may be mined to extract the additional words such as song titles, movie titles, and the like.

Figure 7:
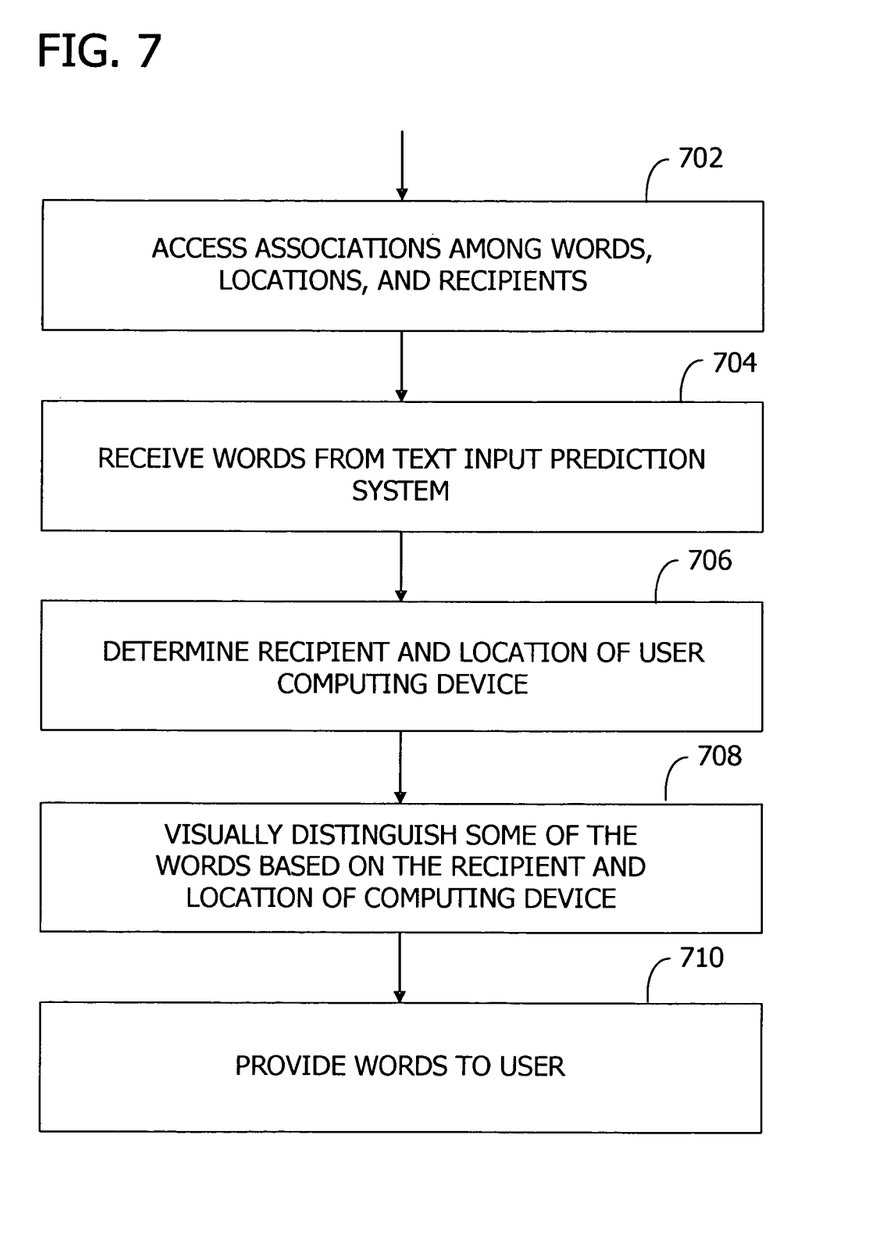
FIG. 7 is an exemplary flow chart describing the selection of words based on a message recipient and a location of a computing device.

Referring next to FIG. 7, an exemplary flow chart describes the selection of words based on a message recipient and a location of the computing device 504. The operations in FIG. 7 are performed in a context such as the example of FIG. 5: the text input prediction system 506 is located with the computing device 504 while the operations illustrated in FIG. 7 are performed by the web service 510.

At 702, the associations among each of a plurality of words, one or more geographic locations, and one or more recipients are accessed. At 704, a plurality of words is received from the text input prediction system 506. In the example of FIG. 7, the text input prediction system 506 does not filter, rank, or sort words based on the recipient or a location of the computing device 504. At 706, the web service 510 determines the recipient of the message and determined a geographic location of the computing device 504. For example, the web service 510 may receive identification of the recipient and geographic location from the computing device 504, or the web service 510 may perform the determinations separate and independent from the computing device 504. In some embodiments, the computing device 504 includes a global positioning system (GPS) for determining the location of the computing device 504.

The web service 510 selects one or more of the received plurality of words based on the determined location, the determined recipient of the message, and the accessed associations. For example, the determined location of the computing device 504 is compared to the locations that are part of the accessed associations. Words that were previously used by the user 102 in locations near the determined location are ranked higher or otherwise given more weight for consideration by the user 102.

In some embodiments, the user 102 provides or defines location designations such as home, school, work, and/or traveling. The user 102 may also provide an acceptable range for each of the designations. Areas within the range are considered proximal enough to be part of the designations. In this embodiment, the determining the location of the computing device 504 at 706 includes selecting one or more of the location designations.

At 708, the selected words are visually distinguished for recognition by the user 102. At 710, the selected words are provided to the user 102 for display on the computing device 504. In some embodiments, the entire plurality of words identified received at 704 are provided to the user 102, with the words selected at 708 being visually distinguished or otherwise identified to the user 102. In other embodiments, only the words selected at 708 are provided to the user 102.

In some embodiments, the selected words may be ordered, ranked, sorted, highlighted, bolded, underlined, italicized, or the like.

Figure 8:
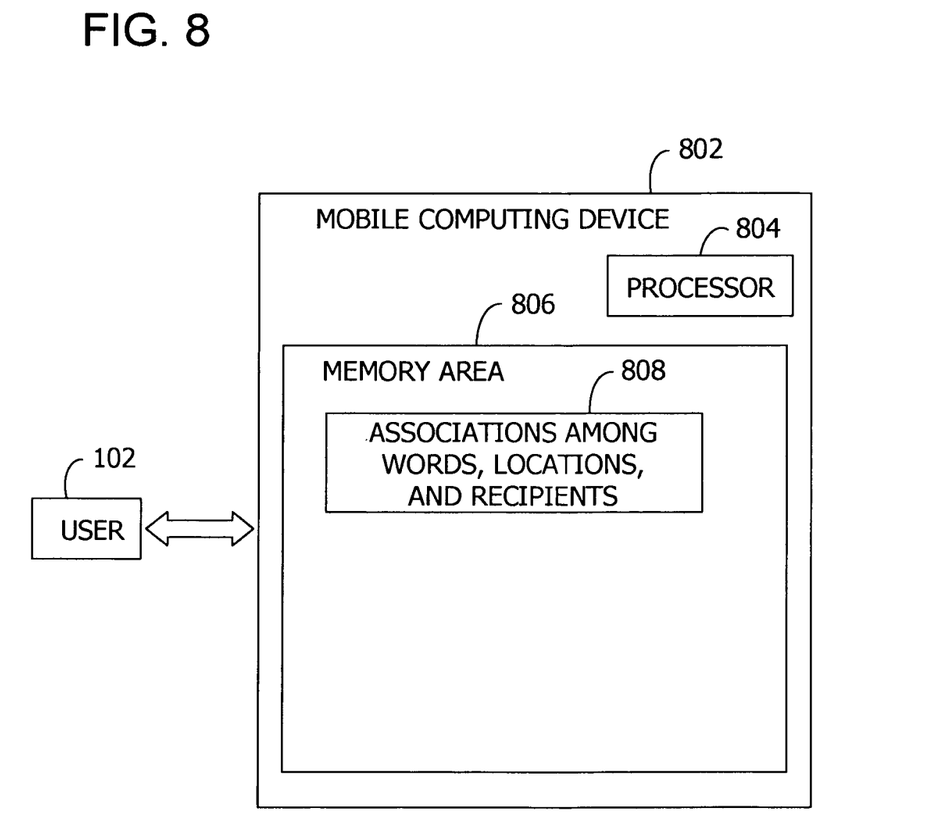
FIG. 8 is an exemplary block diagram illustrating a mobile computing device providing associations among words, geographic locations, and message recipients.

Referring next to FIG. 8, an exemplary block diagram illustrates the mobile computing device 802 providing associations 808 among words, geographic locations, and message recipients. In the example of FIG. 7, the user 102 interacts with the mobile computing device 802. The mobile computing device 802 includes a processor 804 and a memory area 806. The memory area 806 stores the associations 808 among each of a plurality of words, one or more geographic locations, and one or more recipients. The associations 808 on the mobile computing device 802 are similar to the associations stored on the computer-readable medium 508 in FIG. 5.

In the example of FIG. 8, the text input prediction system 506 is integrated or encapsulated within the mobile computing device 802, in addition to the associations 808. The processor 804 is configured to receive text input from the user 102 on the mobile computing device 802, predict one or more words based on the received text input, determine a geographic location of the mobile computing device 802 of the user 102 responsive to the received text input, select one or more of the predicted words (e.g., based on the determined location, the recipients of the message, and the associations 808 stored in the memory area 806), and display the selected words to the user 102 on the mobile computing device 802.

Figure 9:
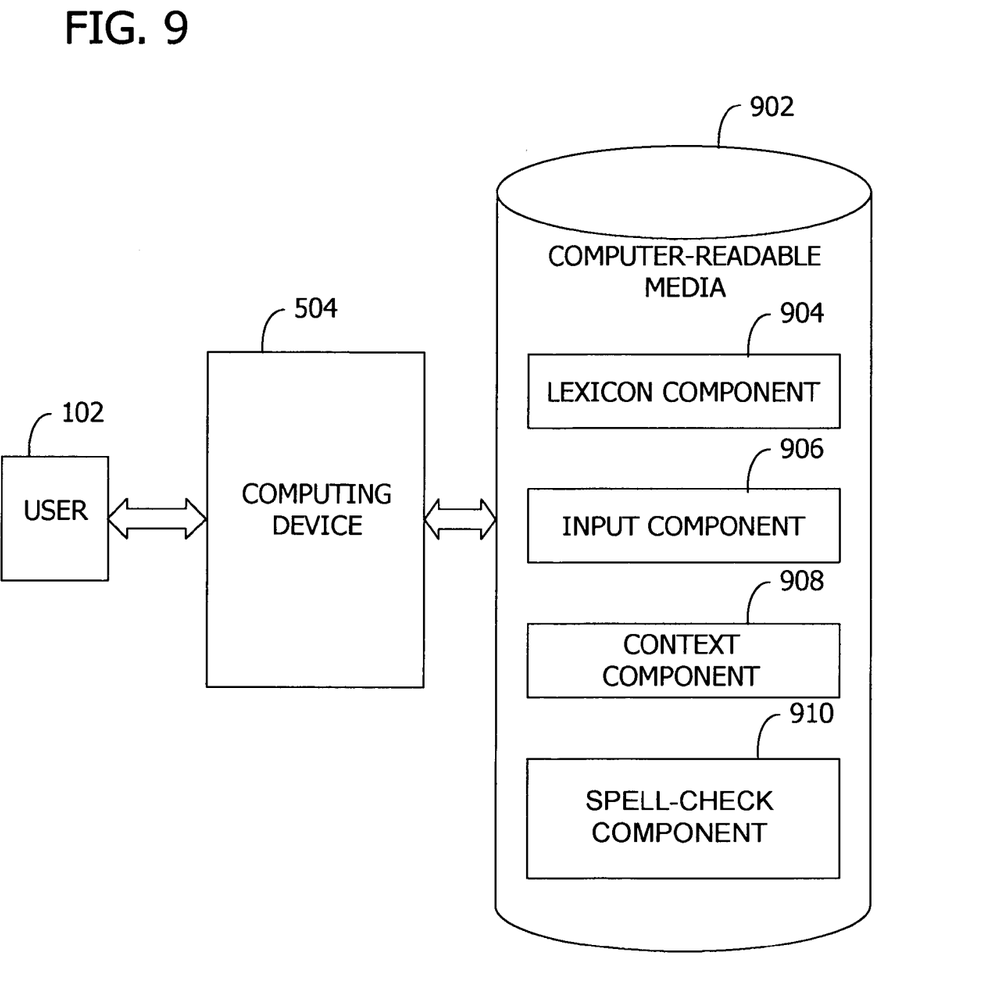
FIG. 9 is an exemplary block diagram illustrating a computing device performing a spell check of a message using a recipient-specific dictionary.

Referring next to FIG. 9, an exemplary block diagram illustrates the computing device 504 performing a spell check of a message using a recipient-specific dictionary. One or more computer-readable media 902 store computer-executable components such as a lexicon component 904, an input component 906, a context component 908, and a spell-check component 910. The lexicon component 904 stores a plurality of dictionaries. Each of the dictionaries is associated with one of a plurality of recipients of messages previously drafted and/or sent. The input component 906 detects the user 102 composing a message to a recipient. The context component 908 selects the dictionary associated with the recipient. A spell-check component 910 executes on the message to determine a spelling accuracy of the words in the message using the selected dictionary. The spell-check component 910 may also provide the user 102 with one or more alternate spellings for at least one of the words.

In some embodiments, the context component 908 selects the dictionary without knowledge of a location of the computing device 504 associated with the user 102. In other embodiments, the context component 908 uses the geographic location to further refine the dictionary selection. In such embodiments, the dictionaries include another attribute for the geographic location of the previous use of each word. If words are used in multiple geographic locations, each of the locations is associated with the word in the dictionary. The dictionary is thus selected based on the recipient and filtered based on the geographic locations, in some embodiments.

Aspects of the disclosure improve the accuracy of the text input prediction system. Other aspects of the disclosure improve the accuracy of handwriting recognition and voice recognition. Existing handwriting and speech input methods use n-gram based lexicon data models to try to match the user's handwriting strokes, or voice sounds, to a possible word. Handwriting and speech input methods are improved by adding the words stored in the input history data store to the lexicon data structure that is used for recognition. In addition, when the user 102 is using handwriting or speech recognition to send a message to the recipient, the words stored in the input history data store that are associated with the recipient are given a higher probability when compared against other words that are not associated with the given recipient.

Aspects of the invention transform a general-purpose computer into a special-purpose computing device when configured to execute the instructions described herein.

While aspects of the invention are described with reference to the computing device 504 being the mobile computing device 802 such as a mobile telephone, embodiments of the invention are operable with any computing device. For example, aspects of the invention are operable with devices such as laptop computers, gaming consoles, hand-held or vehicle-mounted navigation devices, portable music players, and other devices.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for recipient-specific lexicon prediction, and exemplary means for location-aware lexicon prediction.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for location-aware word prediction, said system comprising:
    a memory area for storing input history data associated with words, one or more geographic locations in which the words were previously input by a user, and one or more previous recipients of the words, the input history data comprising the words, wherein each word has a user attribute, a recipient attribute, and a geographic location attribute; and
    a processor programmed to:
        receive one or more words in a first message to one of the previous recipients, said first message being composed by the user while in a geographic location;
        create the input history data comprising received words each word of the received words having the user attribute associating the user with the word, the recipient attribute associating said one of the previous recipient with the word, and the geographic location attribute associating the geographic location with the word;
        store the created input history data in the memory area;
        subsequently receive text input from the user, said user composing a second message to said one of the previous recipients;
        search the stored input history data and select words for prediction based on the received text input, with probability of the prediction being higher for the selected words with the recipient attribute associated with said one of the previous recipients compared to other selected words;
        predict a plurality of words based on the selected words having the higher probability;
        determine a geographic location of the user responsive to the received text input;
        access the stored input history data in the memory area and identify at least one word from the predicted plurality of words, the at least one word having a geographic location attribute associated with the determined geographic location;
        rank the predicted plurality of words such that more weight is given to the identified at least one word compared to other of the predicted plurality of words;
        select one or more of the ranked words; and
        provide the selected one or more ranked words for display to the user,
        wherein the input history data stored in the memory area represent lexicon data, wherein the lexicon data is stored on a service accessible from a plurality of computing devices via a network, and wherein the lexicon data is used by one or more of the following in communication with the service: a speech recognition engine, a handwriting recognition engine, and a spell check engine.

2. The system of claim 1, wherein the processor is further configured to detect the user drafting the second message and to obtain the text input from the user responsive to the detection.

3. The system of claim 1, wherein the processor is configured to identify the geographic location of a mobile computing device that was used by the user at the time of delivery of the first message.

4. The system of claim 1, wherein the geographic locations represent areas that are within an acceptable range of a home, a school or a workplace, the acceptable range being defined by the user.

5. The system of claim 1, wherein the processor is further configured to select words for prediction based on accessing at least one social networking site associated with said one of the previous recipients of the first message.

6. The system of claim 1, further comprising means for recipient-specific lexicon prediction.

7. The system of claim 1, further comprising means for location-aware lexicon prediction.

8. A method for location-aware word prediction, said method comprising:
    storing, in a memory area, input history data associated with words, one or more geographic locations in which the words were previously input by a user, and one or more previous recipients of the words, the input history data comprising the words, wherein each word has a user attribute, a recipient attribute, and a geographic location attribute; and
    providing a processor that performs:
        receiving one or more words in a first message to one of the previous recipients, said first message being composed by the user while in a geographic location;
        creating the input history data comprising received words, each word of the received words having the user attribute associating the user with the word, the recipient attribute associating said one of the previous recipients with the word, and the geographic location attribute associating the geographic location with the word;
        storing the created input history data in the memory area;
        subsequently receiving text input from the user, said user composing a second message to said one of the previous recipients;
        searching the stored input history data and select words for prediction based on the received text input, with probability of the prediction being higher for the selected words with the recipient attribute associated with said one of the previous recipients compared to other selected words;
        predicting a plurality of words based on the selected words having the higher probability;
        determining a geographic location of the user responsive to the received text input;
        accessing the stored input history data in the memory area and identifying at least one word from the predicted plurality of words, the at least one word having a geographic location attribute associated with the determined geographic location;
        ranking the predicted plurality of words such that more weight is given to the identified at least one word compared to other of the predicted plurality of words;
        selecting one or more of the ranked words; and providing the selected one or more ranked words for display to the user, wherein the input history data stored in the memory area represent lexicon data, wherein the lexicon data is stored on a service accessible from a plurality of computing devices via a network, and wherein the lexicon data is used by one or more of the following in communication with the service: a speech recognition engine, a handwriting recognition engine, and a spell check engine.

9. The method of claim 8, further comprising: visually distinguishing the selected one or more words among the predicted plurality of words; and providing the predicted plurality of words to the user for display, said predicted plurality of words including the visually distinguished words.

10. The method of claim 8, further comprising ordering the selected one or more words.

11. The method of claim 8, wherein determining the geographic location comprises one or more of the following: receiving identification of the geographic location, and selecting one or more location designations.

12. The method of claim 8, further comprising receiving location designations from the user, said location designations comprising one or more of the following: home, work, school, and traveling, and further comprising defining an acceptable range for each of the location designations.

13. The method of claim 12, further comprising comparing the determined geographic location to the received location designations to identify the location designation closest to the determined geographic location.

14. One or more computer memories storing instructions that, when executed by a processor, cause at least a processor to:

store, in a memory area, input history data associated with words, one or more geographic locations in which the words were previously input by a user, and one or more previous recipients of the words, the input history data comprising the words, wherein each word has a user attribute, a recipient attribute, and a geographic location attribute;

receive one or more words in a first message to one of the previous recipients, said first message being composed by the user while in a geographic location;

create the input history data comprising received words, each word of the received words having the user attribute associating the user with the word, the recipient attribute associating said one of the previous recipients with the word, and the geographic location attribute associating the geographic location with the word;

store the created input history data in the memory area;

subsequently receive text input from the user, said user composing a second message to said one of the previous recipients;

search the stored input history data and select words for prediction based on the received text input, with probability of the prediction being higher for the selected words with the recipient attribute associated with said one of the previous recipients compared to other selected words;

predict a plurality of words based on the selected words having the higher probability;

determine a geographic location of the user responsive to the received text input;

access the stored input history data in the memory area and identify at least one word from the predicted plurality of words, the at least one word having a geographic location attribute associated with the determined geographic location;

rank the predicted plurality of words such that more weight is given to the identified at least one word compared to other of the predicted plurality of words;

select one or more of the ranked words; and provide the selected one or more ranked words for display to the user, wherein the input history data stored in the memory area represent lexicon data, wherein the lexicon data is stored on a service accessible from a plurality of computing devices via a network, and wherein the lexicon data is used by one or more of the following in communication with the service: a speech recognition engine, a handwriting recognition engine, and a spell check engine.

15. The one or more computer memories of claim 14, wherein the instructions that, when executed by a processor, further cause the processor to:

detect the user drafting the second message and to obtain the text input from the user responsive to the detection.

16. The one or more computer memories of claim 14, wherein the instructions that, when executed by a processor, further cause the processor to:

identify the geographic location of a mobile computing device that was used by the user at the time of delivery of the first message.

17. The one or more computer memories of claim 14, wherein the memory area further stores one or more other words mined from social networking websites listing at least one of the one or more previous recipients.

18. The one or more computer memories of claim 14, wherein the determined geographic location lies within an acceptable range.

19. The one or more computer memories of claim 14, wherein the instructions that, when executed by a processor, further cause the processor to:

receive location designations from the user, said location designations comprising one or more of the following: home, work, school, and traveling, and further comprising defining an acceptable range for each of the location designations.

20. The one or more computer memories of claim 19, wherein the instructions that, when executed by a processor, further cause the processor to:

compare the determined geographic location to the received location designations to identify the location designation closest to the determined geographic location.

* * * * *